INVENTORS
WILLIAM G. BALDENHOFER
FRITZ G. KRAFFT
BY Toulmin & Toulmin
ATTORNEYS

Sept. 19, 1967 W. G. BALDENHOFER ET AL 3,341,983
METHOD AND APPARATUS FOR CONTINUOUSLY CLARIFYING
MACHINE TOOL COOLANT AND THE LIKE
Filed Oct. 6, 1964 3 Sheets-Sheet 1

INVENTORS
BY
Toulmin & Toulmin
ATTORNEYS

INVENTORS
WILLIAM G. BALDENHOFER
FRITZ G. KRAFFT
BY Toulmin & Toulmin
ATTORNEYS

INVENTORS
WILLIAM G. BALDENHOFFER
BY FRITZ G. KRAFFT
Toulmin & Toulmin
ATTORNEYS United States Patent Office 3,341,983
Patented Sept. 19, 1967

3,341,983

METHOD AND APPARATUS FOR CONTINUOUSLY CLARIFYING MACHINE TOOL COOLANT AND THE LIKE

William G. Baldenhofer, 4222 Grant Road, Springfield, Ohio 45502, and Fritz G. Krafft, Springfield, Ohio; said Krafft assignor to said Baldenhofer Filed Oct. 6, 1964, Ser. No. 401,821
13 Claims. (Cl. 51—267)

This invention relates to a method and apparatus for clarifying suspensions, and particularly for clarifying machine tool coolants which contain particles picked up during the machining process such as the swarf generated during a grinding operation.

The clarification of machine tool coolants is always of importance, and it is particularly necessary in connection with a grinding operation because the swarf carried in the coolant from a grinding operation is highly abrasive and consists of metal particles removed from the workpiece being ground, particles of abrasive, and particles of the binder of the grinding wheel which crumble from the wheel during a grinding operation. This type of swarf has always been difficult to separate from the coolant although many attempts, such as a filter system including a filter system with moving filter belts have been employed. Such filter arrangements are expensive and bulky and are subject to failure.

The present invention has as a primary object the provision of a method and apparatus for clarifying machine tool coolant, particularly for grinding machines in which the apparatus employed is relatively compact and inexpensive, but wherein the results obtained are superior to those that have been obtainable heretofore.

Another object of the present invention is the provision of a method and apparatus for clarifying machine tool coolant, particularly for grinding machines, in which the swarf is removed from the coolant in substantially dry form so that it can be readily disposed of without difficulty.

Still another object of this invention is the provision of a method and apparatus for clarifying machine tool coolant which provides a quantity of coolant substantially constant at all times while also maintaining a substantially uniform concentration of cutting oil or other additives in the coolant.

It is also an object of this invention to provide a method and apparatus for clarifying coolant, particularly the coolant for a grinding machine, in which the apparatus is readily adaptable to old equipment as well as new manufacture.

Another object of the invention is the provision of a method and apparatus for clarifying coolant in which the coolant supply to the machine tool can be cut off while the clarification of the coolant can continue.

These and other objects and advantages of this invention will become fore apparent upon reference to the following specification taken in connection with the accompanying drawings, in which.

Figure 1:
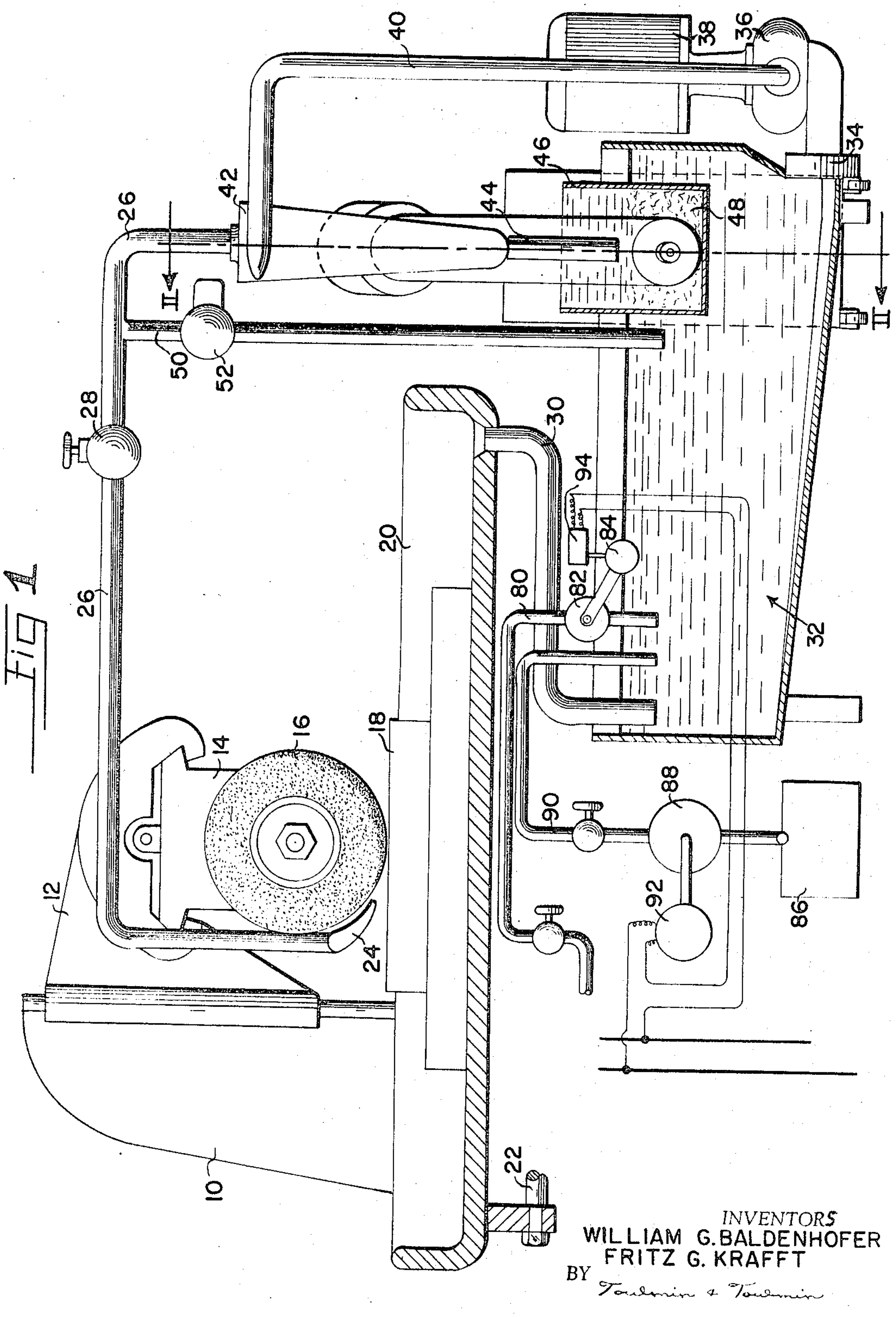
FIGURE 1 is a schematic view partly in section showing an installation according to the present invention.

Referring to the drawings somewhat more in detail,

FIGURE 1 shows schematically a grinding machine having a column 10 on which is vertically reciprocated a saddle 12 which reciprocably supports a wheel head 14 that rotatably carries a grinding wheel 16. Grinding wheel 16 is adapted for grinding the surface of a workpiece 18 carried on reciprocable bed 20 of the machine. Bed 20 is adapted for reciprocation, for example, by a fluid motor having a ram 22 connected to the bed.

During a grinding operation coolant is supplied to the region being ground through a nozzle 24 connected with a supply conduit 26 having a control valve 28 therein.

The coolant supplied to the grinding area flows to table 20 and is discharged therefrom by way of a conduit 30 to a tank 32. It will be understood that conduit 30 is flexible or includes other devices for permitting table 20 to reciprocate while tank 32 remains stationary. The coolant delivered through conduit 30 to tank 32 is laden with swarf, including particles of metal, abrasive particles dislodged from wheel 16, and particles of the binder of wheel 16 which crumble therefrom during a grinding operation.

The coolant and entrained swarf are delivered to tank 32 adjacent one end and is removed therefrom through a discharge opening 34 adjacent the other end which is connected to the inlet side of a pump 36 driven by an electric motor 38.

The bottom of the tank slopes downwardly from the end where conduit 30 delivers the swarf laden coolant to the discharge opening 34 so that the swarf entrained in the coolant all tends to be delivered to the inlet of pump 36.

Pump 36 has a discharge side that delivers to conduit 40 which is connected to the upper inlet end of a vortex type separator or clarifier 42. The clarifier has a discharge opening at the bottom for separated particles and which opening is surrounded by a tube 44 that extends downwardly into a second tank 46. The material discharged into tank 46 is coolant fluid heavily laden with swarf. The swarf will settle out in the bottom of the second tank 46 as indicated at 48 and the liquid delivered to tank 46 will overflow therefrom into tank 32. This overflowing liquid is substantially clear with only the extremely light particles of the swarf being carried over and back into tank 32.

In any case, any particles of overflow from the second tank 46 into the first tank 32 will have to pass back through the vortex clarifier or separator 42 and will again be delivered to tank 46.

Separator 42 has an outlet in the top for clarified coolant to the aforementioned conduit 26, thereby completing the circuit for the coolant.

Conduit 26, upstream of valve 28, has a bypass conduit 50 connected thereto with a spring loaded valve 52 therein. Conduit 50 leads into tank 32 so that any excess delivery from separator 42 over what will pass through valve 28 will bypass through spring loaded valve 52 back to tank 32. This arrangement permits closing of valve 28 so the coolant supply is thereby interrupted to the grinding wheel to permit inspection of the workpiece or exchange thereof, and while valve 28 is closed, the separating action can continue with the discharge from the separator all passing via conduit 50 through valve 52 back to tank 32 whereby clarification of the coolant in tank 32 can continue.

Figures 2, 3:
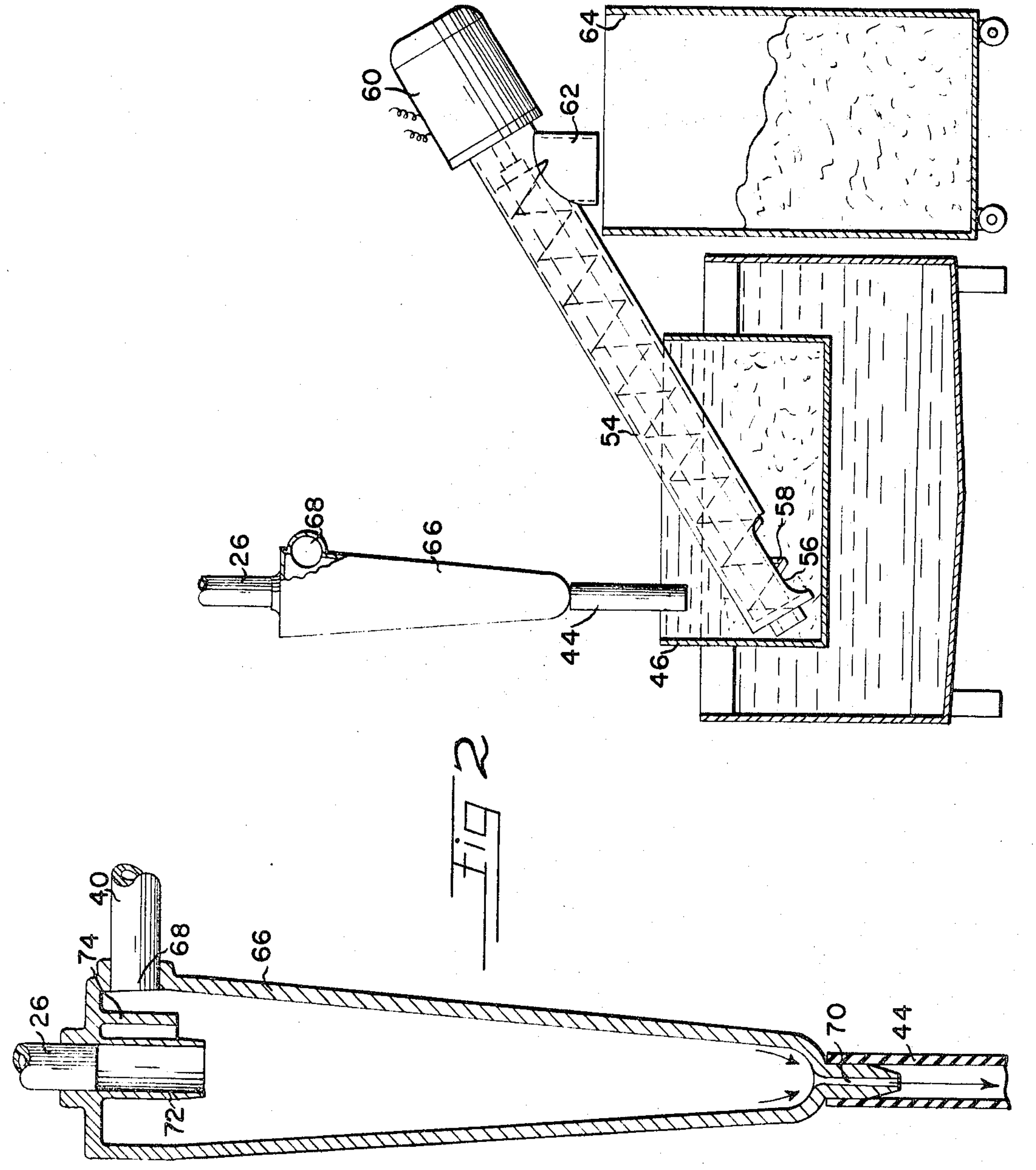
FIGURE 2 is a vertical sectional view indicated by line II—II on FIGURE 1.
FIGURE 3 is a vertical sectional view drawn at somewhat enlarged scale showing the vortex type separator or cleaner forming an important element of the present invention.

As will be seen in FIGURE 2, an auger type swarf removal device extends in to the second tank 46. This device comprises an outer tube 54 extending down into tank 46 and having an opening 56 at the lower end exposing screw 58. Screw 58 is adapted for rotation, preferably at relatively low speed, by drive motor 60 and is operable for slowly moving swarf from tank 46 upwardly within tube 54 to the discharge opening 62 adjacent the upper end of the tube which is positioned over cart 64 into which the swarf will drop. Due to the slow movement of the swarf upwardly within tube 54, substantially all of the liquid entrained therein has an opportunity to drain down the tube to tank 46, and the swarf delivered to cart 64 is therefore substantially completely dry.

FIGURE 3 will show somewhat more in detail the construction of the separator wherein it will be seen to comprise an outer chamber portion 66 having an inlet 68 extending tangentially therein in the upper end. The swarf laden liquid delivered to inlet 68 spirals within chamber 66 and moves downwardly toward the bottom rotating at an ever increasing speed, and developing extremely high centrifugal force on the particles entrained in the liquid which drives the particles to the outer wall of chamber 66. These particles then slide down the outer wall and are discharged from the separator through the relatively small discharge opening 70 in the bottom and pass therefrom downwardly through tube 44 into tank 46. Due to the high rate of rotation of the liquid within chamber 66, a void is created in the center of the chamber and a subatmospheric condition can be created in the region of discharge opening 70 and this can cause air to be drawn into chamber 66 unless tube 44 is provided which dips into tank 46 and thus seals the lower end of the separator from the atmosphere. Additionally, tube 44 can be a transparent plastic so that the operation of the device can readily be observed.

The end portion of conduit 26 which is connected to the upper discharge opening 72 of the separator can also be transparent plastic, if desired, so that the clarity of the coolant discharged from the separator can also be readily observed.

Inlet opening 72 extends axially into the separator beyond inlet opening 68 so that there is no possibility for liquid to move directly from conduit 40 into conduit 26. Still further, a baffle member 74 can be included in the separator adjacent inlet opening 78 and this will still further insure that all liquid entering the inlet opening 68 will take a spiral path downwardly through the separator, thus giving ample opportunity for particles to separate from the liquid and insuring a supply of substantially particle-free liquid to discharge opening 72 and, therefore, to conduit 26.

Returning to FIGURE 1, the level of the coolant in tank 32 is adapted for being maintained by providing a coolant supply conduit 80 having a control valve 82 therein which is under the control of a float 84 dipping into the liquid in tank 32. This may, for example, be a supply of water.

An oil or other additive is usually supplied to the coolant, and this could be added at the same time as the water is supplied so as to maintain the coolant substantially constant by providing a supply 86 of the additive which could be delivered to the coolant tank by a pump 88 via conduit 90, said pump 88 being driven by a motor 92 the energization of which is under the control of a limit switch 94 which is actuated by float 84. Alternatively, an aspirating unit could be employed in conduit 80 so that any supply of water therethrough would aspirate from additive supply 86 and deliver it to tank 32 together with a supply of water.

In connection with the system according to this invention, it has been customary in the use of grinding machines particularly to provide these machines with a method of clarifying the coolant, since repeated pumping of contaminated coolant between the work and grinding wheel severely damages the efficiency of the grinding wheel, and causes frequent retruing, with consequent loss of time, grinding wheel and diamond material. To offset this efficiency it has been customary to purchase various types of filtering devices consisting essentially of paper material onto which the contaminated coolant is discharged, and as the material becomes charged with residue of the grinding operation, it is caused to move on a mechanized chain belt to present new paper to the oncoming contaminated coolant. While such a device is satisfactory, it is relatively expensive (in the area of $1500.00 to $3500.00) and in addition requires frequent replacement of the paper or cloth filtering material and consequent down time of the machine. The selection of the filtering medium, such as paper or cloth, is also of vital importance and depends on many factors such as rate of contamination, specific type of material being removed, and type of coolant being presented for filtration.

In the apparatus described herein a great many of these objections have been removed, and it is considered that the apparatus described in this application may be suitable for filtration of most contaminated liquids. The described apparatus is considered practical for use in so-called electrolytic grinding in which a concentrated salt solution is presented to the grinding wheel and by electrolytic action becomes contaminated with various metals, the chips being in extremely fine, or powdered form and difficult to separate from the salt solution.

It is to be noted that in the present apparatus that the coolant, which is contaminated, is pumped directly to a clarifier or separaor. The clarifier may be made of Zytel, which is a plastic material impervious to most acids and alkalines, and has the very favorable characteristic of preventing plating or sticking. The coolant on entering the clarifier is subjected to centrifugal motion of an extremely high rate, and the clarifier, being of conical shape, permits the coolant gradually to move by gravity to its lower portion, and at which point the body of the clarifier constricts in a cone-shape configuration, increasing the speed and gravity of the liquid. The contaminant is thereby centrifuged to the outside periphery and is gradually discharged at the lower nozzle. In the center of the mass of coolant there is obviously an internal pressure exerted which is pumped off the top of the clarifier.

As the highly contaminated coolant emerges from the lower nozzle of the clarifier, and is delivered in a submerged state to the swarf tank the speed of the contaminant is greatly reduced and thereby settles out of the coolant mixture since it has lost most of its energy. It therefore flows into the swarf tank and the coolant, which has become entrapped in the contaminated mixture gradually overflows in small volume over the top of the swarf tank into the main coolant tank. As the swarf is deposited in the bottom of the swarf tank, the auger revolving at approximately 1.5 r.p.m. slowly elevates the soaked mixture up the screw flights. As the mixture is withdrawn from the swarf tank and is delivered to the swarf discharge it is in a substantially dry condition. The auger, or screw, continuously rotating will eventually discharge all the accumulated swarf into the swarf removal cart as shown. It has been found that by very slow movement of the screw there is practically no coolant discharged with the swarf. This makes for ready disposition of the swarf when the removal cart has been filled.

An added feature, heretofore not possible, has been incorporated in this system by use of a fresh water make-up line, controlled by a conventional float valve, which maintains a reasonably exact level of coolant in the coolant tank. A great deal of the coolant mix and water is, of course, evaporated in the work process, and it is necessary in the limited capacity of the coolant tank to frequently replenish the supply. It is however not sufficient to merely add water, as it is desirable to keep the coolant mixture which is ordinarily approximately 50 to 70:1 water to oil in reasonable stability. There has been added therefore a fresh oil make-up valve, which can be manually operated or in the event complete automation is desired, the fresh oil make-up line can be connected to a small oil pump which will be energized and deliver oil only during the fresh water make-up period, at which time the ratio of oil to water can be accurately regulated, and a balance maintained in the coolant supply tank.

The cost of the system described is a fraction of that required by the use of known filtering mechanisms and clarification is effected to a better degree than by the use of known filtering mechanisms.

In the case where corrosive liquids such as salt water are to be used, such as in electrolytic grinding, the components of the system should be made of stainless steel, and of plastic material, where applicable. The system heretofore described lends itself admirably to this construction, since the main tank can readily be made of stainless steel and the other components, such as the swarf tank, the swarf auger and the tube can readily be made of plastic materials.

Figures 4, 5:
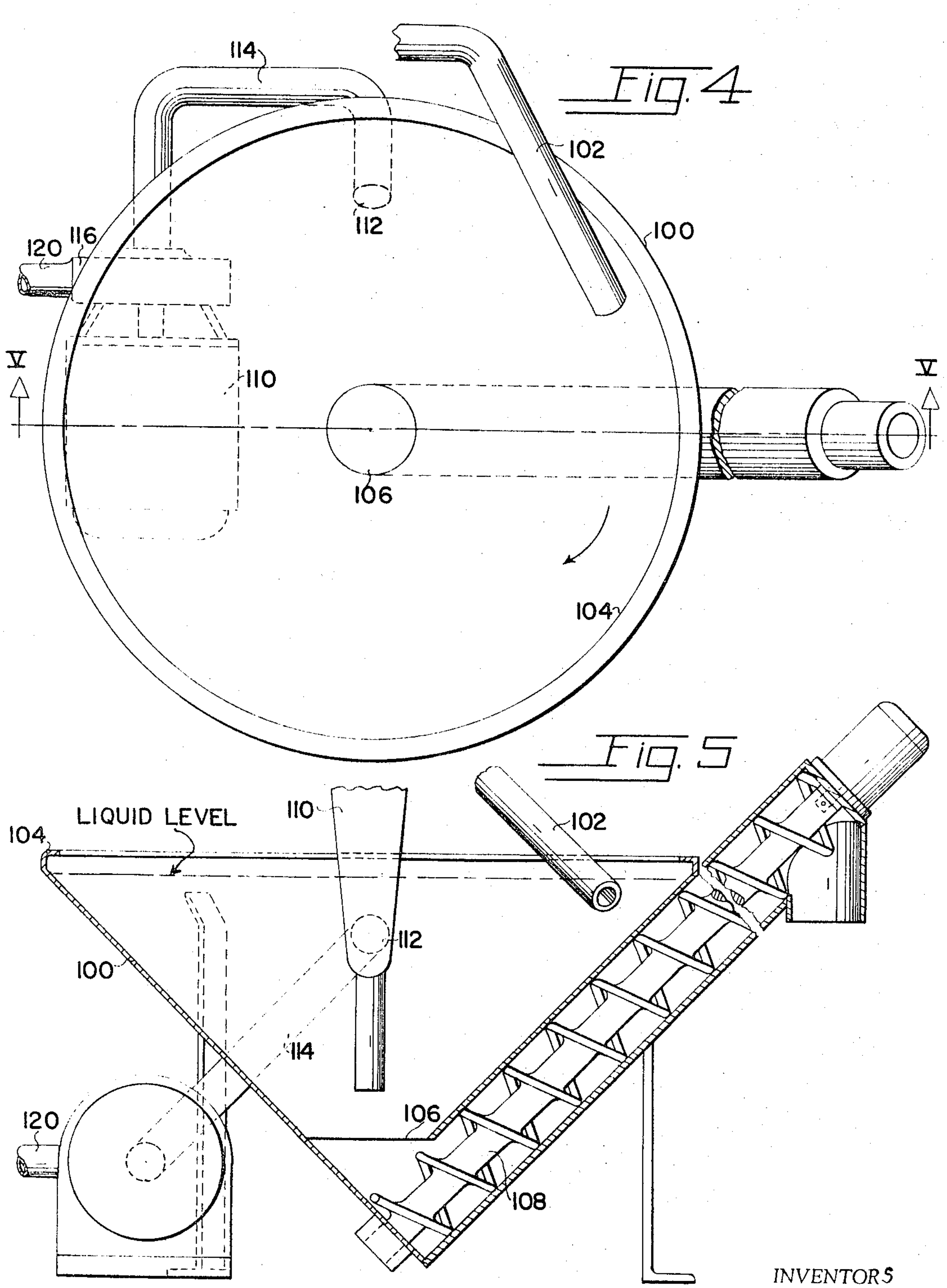
FIGURE 4 is a plan view of a modified arrangement.
FIGURE 5 is a vertical section taken on line V—V of FIGURE 4.

FIGURES 4 and 5 show a modification having advantages in certain instances.

It has been found at times that sufficient swarf is contained within the coolant to clog the clarifier and particularly where large particles of swarf material are presented to the clarifier in relative high concentration. In the modification of FIGURES 4 and 5 a simple preliminary separation of swarf material from coolant is obtained which will prevent overloading of the clarifier and thus prevent shut-downs in connection with the grinding of materials that will produce swarf of the nature that might tend to clog the clarifier.

As will be seen in FIGURES 4 and 5, there is a tank 100 to which the swarf laden coolant is delivered from the griding machine by way of a conduit 102 extending into the tank 100 near the top and in a substantially tangential direction. Tank 100, as will best be seen in FIGURE 5, is conical and has an inturned upper edge 104 which will tend to prevent the coolant from overflowing the tank due to the rotary motion of the coolant in the tank.

Tank 100 has an opening 106 at the apex thereof, which is at the bottom of the tank and because of the rotary motion of the swarf laden coolant in the tank, a considerable amount of the swarf, and particularly the heavier swarf particles, will be driven out to the outside of the tank and moved down the inclined walls through opening 106 where it will be picked up by auger 108 and discharged to a swarf cart in the same manner as described in connection with the first modification.

Still further, swarf that has a tendency to become aerated and float on top of the coolant as, for example, swarf from soft steel, tends to move to the center of the rotated body of coolant and this material gradually becomes heavier and becomes deaerated and will sink downwardly in the coolant through opening 106 and be picked up by auger 108 and discharged.

The coolant that is delivered to the classifier or separator, indicated at 110 in FIGURE 5, is taken off tank 100 by way of opening 112, which is located near the top of the tank and preferably circumferentially spaced a substantial distance in the direction of rotation of the coolant from the outlet end of conduit 102. This described location of opening 112 permits the withdrawal from tank 100 of coolant substantially free of heavy swarf particles.

Opening 112 communicates by way of conduit 114 with the suction side of pump 116 driven by motor 118, and the pump has a discharge conduit 120 which delivers the swarf to the classifier or separator 110, as described in connection with the first modification.

The separated swarf that is discharged from separator 110 is delivered back into tank 100 above opening 106, and preferably near the bottom of tank 100, so that the discharged concentrated swarf can pass directly to auger 108.

By the practice of the present invention, it has been found that swarf of substantially any nature can sufficiently and efficiently be separated from the vehicle coolant. Thus, both magnetic and nonmagnetic swarf can be separated with equal ease, as can both heavy and light swarf materials, and the aforementioned fibrous materials that tend to glomerate into aerated clumps, and also extremely fine materials that may be found in connection with electrolytic machining and which, heretofore, has proved most difficult to remove by any known filtration process.

It will be understood that this invention is susceptible to modification in order to adapt it to different usages and conditions; and accordingly, it is desired to comprehend such modifications within this invention as may fall within the scope of the appended claims.

What is claimed is:

1. In a system for clarifying particle bearing liquids; a first tank for receiving the liquid to be clarified, a pump having its inlet connected to the bottom of the tank to withdraw particle bearing liquid to be clarified therefrom, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet including tube means extending from the separator to below the liquid level in said second tank, and means for withdrawing the said separated out particles in said second tank in substantially dry condition, said liquid to be clarified being delivered to said first tank at the end opposite the connection to the tank of the pump inlet, and the bottom of said tank being inclined downwardly toward the connection of the tank with said pump inlet so that all particles supplied to the tank with the liquid will move to said pump inlet.

2. In a system for clarifying particle bearing liquids, a first tank for receiving the liquid to be clarified, a pump having its inlet connected to the bottom of the tank to withdraw particle bearing liquid to be clarified therefrom, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet including tube means extending from the separator to below the liquid level in said second tank, means for withdrawing the said separated out particles in said second tank in substantially dry condition, said liquid to be clarified being delivered to said first tank at the end opposite the connection to the tank of the pump inlet, and the bottom of said tank being inclined downwardly toward the connection of the tank with said pump inlet so that all particles supplied to the tank with the liquid will move to said pump inlet, a conduit leading from the said first outlet of the separator to a working region for delivering clarified liquid thereto, and a bypass conduit connected between said last-mentioned conduit and said tank and including valve means for controlling the flow of liquid from the said first-mentioned conduit to the tank.

3. In a system for clarifying particle bearing liquids; a first tank for receiving the liquid to be clarified, a pump having its inlet connected to the bottom of the tank to withdraw particle bearing liquid to be clarified therefrom, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet including tube means extending from the separator to below the liquid level in said second tank, means for withdrawing the said separated out particles in said second tank in substantially dry condition, said liquid to be clarified being delivered to said first tank at the end opposite the connection to the tank of the pump inlet, and the bottom of said tank being inclined downwardly toward the connection of the tank with said pump inlet so the pump will withdraw all particles delivered to said tank with said liquid, a supply conduit leading from said first outlet of said first separator to a working region for supplying clarified liquid thereto, a valve in said conduit, and a bypass conduit connected with said supply conduit on the upstream side of said valve and leading into said first tank, said bypass conduit including spring loaded valve means for controlling the flow of liquid through said bypass conduit.

4. In a system for clarifying particle bearing liquids; a first tank for receiving the liquid to be clarified at one end, a pump having its inlet connected to the tank at the bottom at the other end to withdraw particle bearing liquid to be clarified therefrom, the bottom wall of said tank sloping downwardly from said one end to said other end, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet extending to below the liquid level in said second tank, and means for withdrawing the said separated out particles in said second tank in substantially dry condition, said last-mentioned means comprising an inclined tube extending into said second tank and having an opening therein, an auger in said second tube, means for rotating said auger to move separated out particles from said second tank upwardly in said tube, and a discharge means for the said separated out particles at a point along said tube outside said second tank.

5. In a system for clarifying particle bearing liquids; a first tank for receiving the liquid to be clarified at one end, a pump having its inlet connected to the tank at the bottom at the other end to withdraw particle bearing liquid to be clarified therefrom, the bottom wall of said tank sloping downwardly from said one end to said other end, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet extending to below the liquid level in said second tank, means for withdrawing the said separated out particles in said second tank in substantially dry condition, a liquid supply conduit leading into said first tank, and a float controlled valve means in said conduit for controlling the liquid level in said first tank, the float of said valve means being disposed in said first tank so as to be sensitive to the liquid level therein.

6. In a system for clarifying particle bearing liquids; a first tank for receiving the liquid to be clarified at one end, a pump having its inlet connected to the tank at the bottom at the other end to withdraw particle bearing liquid to be clarified therefrom, the bottom wall of said tank sloping downwardly from said one end to said other end, a vortex separator having an inlet connected to the discharge side of said pump, a first outlet for clarified liquid from the separator, a second outlet from the separator for separated out particles and liquid entrained therein, a second tank beneath said second separator outlet and arranged to overflow liquid into said first tank while retaining the separated out particles, said second outlet extending to below the liquid level in said second tank, means for withdrawing the said separated out particles in said second tank in substantially dry condition, a liquid supply conduit leading into said first tank, a float controlled valve means in said conduit for controlling the liquid level in said first tank, the float of said valve means being in said first tank to be influenced by the liquid level therein, a source of additive for the liquid in said first tank, and means operated by movement of said float into position to open said valve means to initiate the supply of additive to said first tank and said means being operated by movement of said float into position to close said valve means to interrupt the supply of additive to said first tank.

7. In combination in a grinding machine; a grinding wheel, a work table for supporting a workpiece to be ground by the wheel, a coolant supply nozzle adjacent the wheel to supply coolant to the wheel and workpiece, a coolant tank connected for receiving the coolant from the said table together with the swarf developed during grinding operation and which is carried by the coolant, a pump having its inlet connected to the bottom of the tank to withdraw swarf laden coolant therefrom, a vortex separator having an inlet, said inlet being connected to the discharge side of the pump, a supply conduit leading from the clarified liquid outlet of said separator to said nozzle, a discharge from the separator for separated out swarf and liquid entrained therein, a swarf tank positioned to receive the swarf from said separator and arranged to overflow liquid into said coolant tank, said separator discharge extending to below the liquid level in said swarf tank, means for withdrawing swarf in substantially dry condition from said swarf tank, and means leading from said supply conduit to said coolant tank in bypassing relation to said nozzle and table to permit clarification of the coolant when there is no supply thereof to said nozzle.

8. A method of clarifying particle bearing liquids which comprises; delivering the liquid to be clarified to a first tank, withdrawing the particle bearing liquid from the bottom of the tank, passing the liquid through a vortex separator, withdrawing clarified liquid from one end of the separator and discharging separated out particles and entrained liquid from the other end of the separator, receiving the separated out particles and the liquid entrained therein in a second tank at a level below the liquid level therein, overflowing liquid from the second tank to the first tank, and withdrawing the separated out particles from the second tank while simultaneously draining liquid therefrom into said second tank.

9. A method according to claim 8 which includes the further step of delivering liquid from the clarified liquid outlet of said separator directly back to said first tank to provide for closed circulation of the liquid with simultaneous clarification thereof.

10. A method according to claim 8 wherein liquid is delivered from the clarified liquid outlet of the separator to a work station wherein the liquid picks up the particles to be separated therefrom and is then returned to said first tank, and selectively bypassing at least a part of the clarified liquid from the liquid outlet of said separator directly back to said first tank.

11. In a system for clarifying particle bearing liquids; a substantially conical tank with its apex at the bottom and having an opening at the bottom, means for delivering the particle bearing liquid in a substantially tangential direction into the tank at a point near the top of the tank whereby the liquid will rotate in the tank and heavy particles in the liquid will tend to be driven out toward the wall of the tank and move downwardly along the wall and through said opening, a pump having its inlet connected to the tank near the top adjacent the periphery of the tank at a point remote from the point of introduction of liquid into the tank for withdrawing liquid therefrom, a vortex separator having an inlet connected to the discharge side of said pump and having a first outlet for clarified liquid and a second outlet for separated out particles and liquid entrained therein, said second outlet extending into said tank and discharging into the said opening in the tank, and conveyor means extending from said opening in the bottom of the tank upwardly to above the liquid level in the tank for withdrawing the separated out material that passes through said opening in substantially dry condition.

12. In combination; a first separator having means for receiving particle bearing liquids and for effecting rotation of the liquid at relatively low speed to cause centrifugal separation from the liquid of the heavier particles therein and including an opening through which the particles are discharged, a second separator, a pump having its outlet connected to the inlet of said second separator and having its inlet connected to withdraw partially clarified liquid from said first separator, a clarified liquid outlet in said second separator, a separated particle outlet in said second separator arranged to discharge substantially directly into the outlet of said first separator, and conveyor means operatively associated with the outlet of said first separator and operable for conveying therefrom particles separated out in both of said separators.

13. A method of clarifying a particle bearing liquid which comprises; rotating the liquid at relatively low speed to centrifuge heavier particles therefrom and delivering said heavier particles to a discharge region, withdrawing liquid and lighter particles from the slowly rotating body of liquid at a point remote from said discharge region and rotating the thus withdrawn partially clarified liquid at high speed to centrifuge therefrom the said lighter particles therefrom, withdrawing clarified liquid from the rapidly rotating body of liquid, and delivering the separated out lighter particles to the same discharge region as the separated out heavier particles for removal simultaneously therewith.

References Cited

UNITED STATES PATENTS

| | | | |
|---|---|---|---|
| 453,105 | 5/1891 | Bretney | 210—512 |
| 1,687,252 | 10/1928 | Laessker | 51—267 X |
| 1,938,875 | 12/1933 | Stratton | 51—267 |
| 2,276,824 | 3/1942 | Carruthers | 51—267 X |
| 2,378,632 | 6/1945 | Hooker et al. | 210—512 |
| 3,034,647 | 5/1962 | Giesse | 210—512 X |
| 3,052,361 | 9/1962 | Whatley et al. | 210—512 |
| 3,080,065 | 3/1963 | Hunt | 210—415 X |

FOREIGN PATENTS

| | | |
|---|---|---|
| 846,987 | 8/1952 | Germany. |

LESTER M. SWINGLE, *Primary Examiner.*